United States Patent
Starinshak

[11] Patent Number: 6,158,490
[45] Date of Patent: Dec. 12, 2000

[54] ELASTOMERIC ARTICLE WITH 2+1+9 OR 2+1+9+1 METALLIC CORD

[75] Inventor: Thomas Walter Starinshak, Wadsworth, Ohio

[73] Assignee: The Goodyear Tire & Rubber Company, Akron, Ohio

[21] Appl. No.: 09/009,790

[22] Filed: Jan. 20, 1998

[51] Int. Cl.[7] .................................. B60C 9/00; B60C 9/04; B60C 9/20; D07B 1/06; D07B 1/08; D07B 1/10

[52] U.S. Cl. ............................. 152/527; 57/213; 57/902; 152/451; 152/556

[58] Field of Search .............................. 57/902, 213, 217, 57/212; 152/451, 527, 556

[56] References Cited

U.S. PATENT DOCUMENTS

| | | | |
|---|---|---|---|
| 4,332,131 | 6/1982 | Palsky et al. | 57/213 |
| 4,601,165 | 7/1986 | Weidenhaupt et al. | 57/213 |
| 4,608,817 | 9/1986 | Brandyberry et al. | 57/213 |
| 4,627,229 | 12/1986 | Bourgois | 57/902 X |
| 4,628,683 | 12/1986 | Bourgois et al. | 57/213 |
| 4,707,975 | 11/1987 | Umezawa | 57/902 X |
| 5,400,580 | 3/1995 | Kuriya et al. | 57/902 X |
| 5,706,641 | 1/1998 | Ishizaka | 57/902 X |

OTHER PUBLICATIONS

International Polymer Science and Technology, vol. 11, No. 10, pp. T/53–T/60, 1984.

*Primary Examiner*—Adrienne C. Johnstone
*Attorney, Agent, or Firm*—Bruce J Hendricks

[57] ABSTRACT

A metallic cord has (a) a core composed of two filaments either parallel or intertwisted with each other, (b) a single filament surrounding the core and (c) a sheath of nine filaments surrounding the core and single filament. Preferably, the diameter of each filament ranges from about 0.15 to 0.4 mm. The cord may reinforce elastomeric articles such as tires, belts and hoses and preferably is used in a belt ply or carcass ply of a pneumatic tire.

17 Claims, 3 Drawing Sheets

ELASTOMERIC ARTICLE WITH 2+1+9 OR 2+1+9+1 METALLIC CORD

BACKGROUND OF THE INVENTION

While the invention is subject to a wide range of applications, it particularly relates to metal cord, such as that used to reinforce elastomers. More particularly, the present invention is directed to a metallic cord construction used to reinforce rubber articles, including pneumatic tires.

It is known to manufacture metal cords from a plurality of filaments having the same diameter twisted together in the same direction and having the same lay length. The cord is said to have a compact cross-section which is generally the same over the length of the cord. The filaments in the cross-section are arranged in concentric layers in which the filaments are tangential to all the filaments surrounding an individual filament. The single operation produces a cord having a single, compact strand. The single strand, compact cord has the advantages of a reduced cord diameter. These advantages include: (1) a calendared ply having a reduced thickness and, therefore, requiring less calendar rubber; (2) a potential increase in the ends per inch for a given width of ply; and (3) an increased ply strength resulting from an increase in the ends per inch. The uniform cross-section is thought to more uniformly distribute the load carried by the cord to each individual filaments. The result is a higher breaking load. Further, the cord is thought to have improved fatigue resistance and greater flexibility.

In a conventional pneumatic radial tire using metal cords, as described above for reinforcement, the fatigue properties of the carcass ply and belt layer are degraded, mainly by material fatigue due to repeated strain and fretting wear in the contact portion between adjacent filaments. Both of these problems are said to be alleviated by penetration of rubber into the inside of the cord. The rubber layer interposed between the steel filaments is believed to prevent rubbing between adjacent filaments, the so-called "fretting wear."

The present invention relates to a cord having improved rubber penetration into the inside of the cord. The improved rubber penetration will also provide the cord with higher corrosion resistance should the cord be exposed to moisture.

SUMMARY OF THE INVENTION

The present invention relates to metallic cord for the reinforcement of elastomers comprising (a) a core composed of two filaments, (b) a single filament surrounding said core and (c) a sheath of nine filaments surround the core and single filament.

DETAILED DESCRIPTION OF THE PREFERRED EMBODIMENT

The present invention will be explained in more detail referring to the accompanying drawings.

Figure 1:
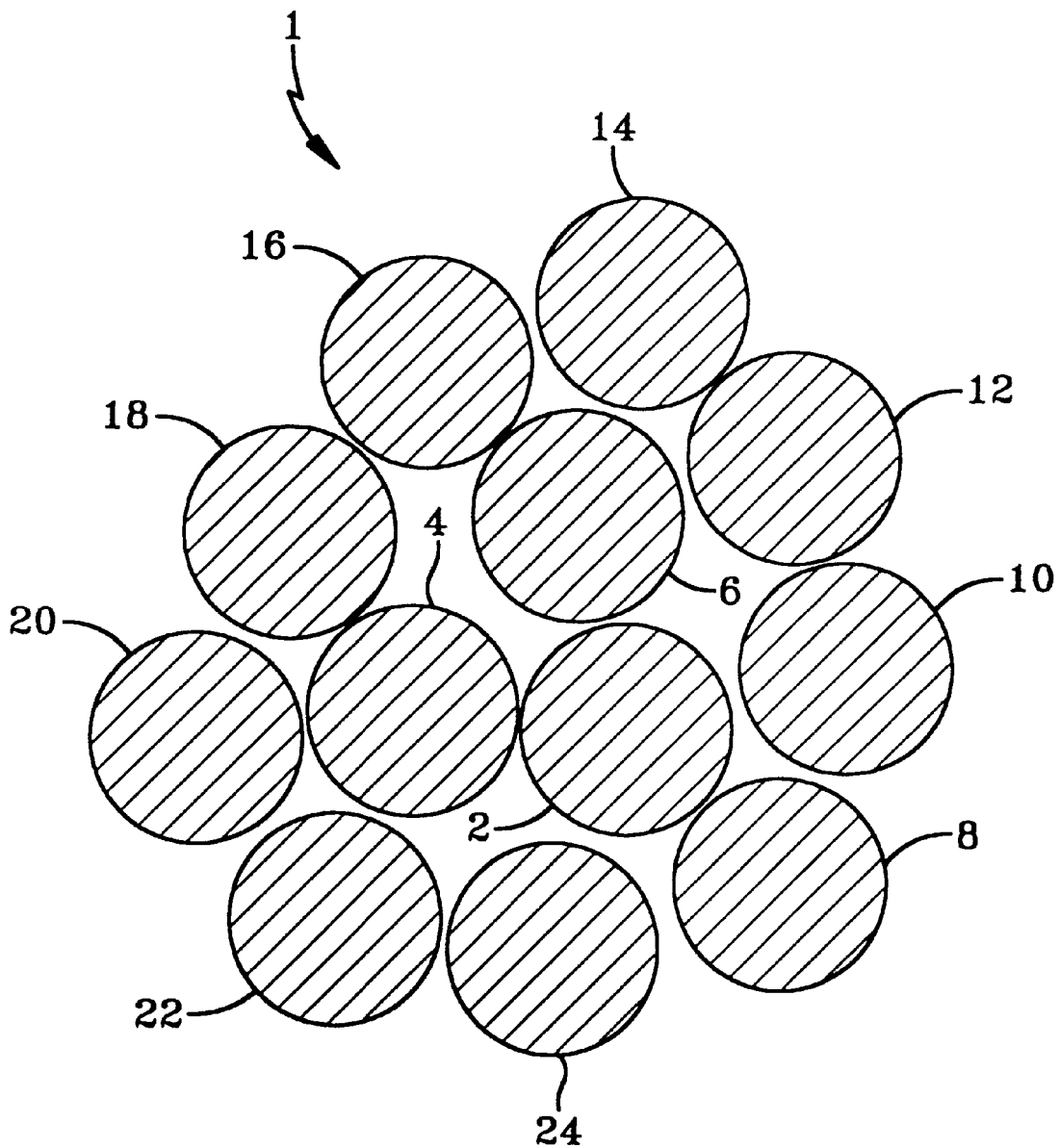
FIG. 1 is a cross-sectional view of a steel cord having a construction of the present invention.
Figure 2:
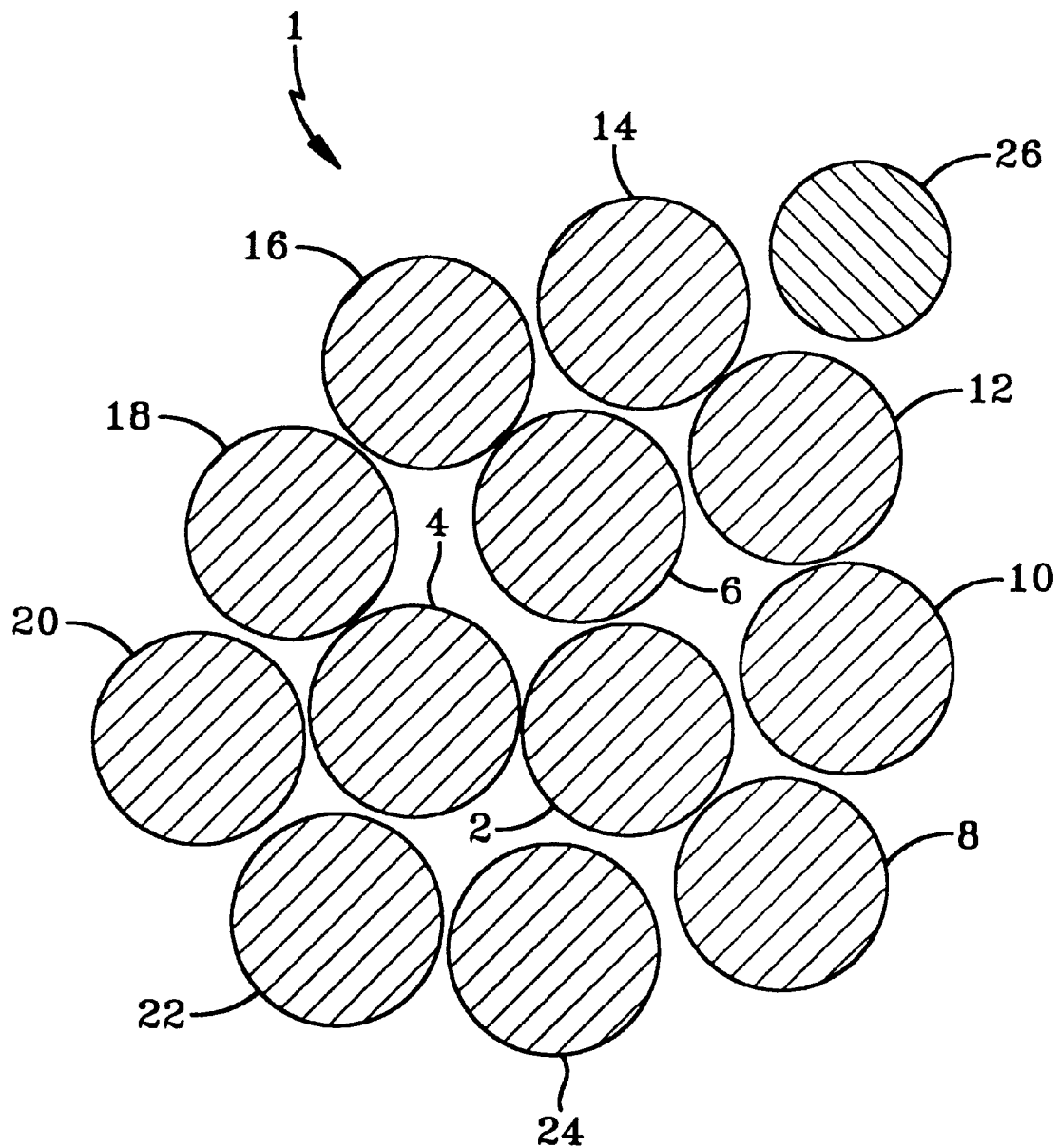
FIG. 2 is a cross-sectional view of a steel cord having a construction of the present invention.
Figure 3:
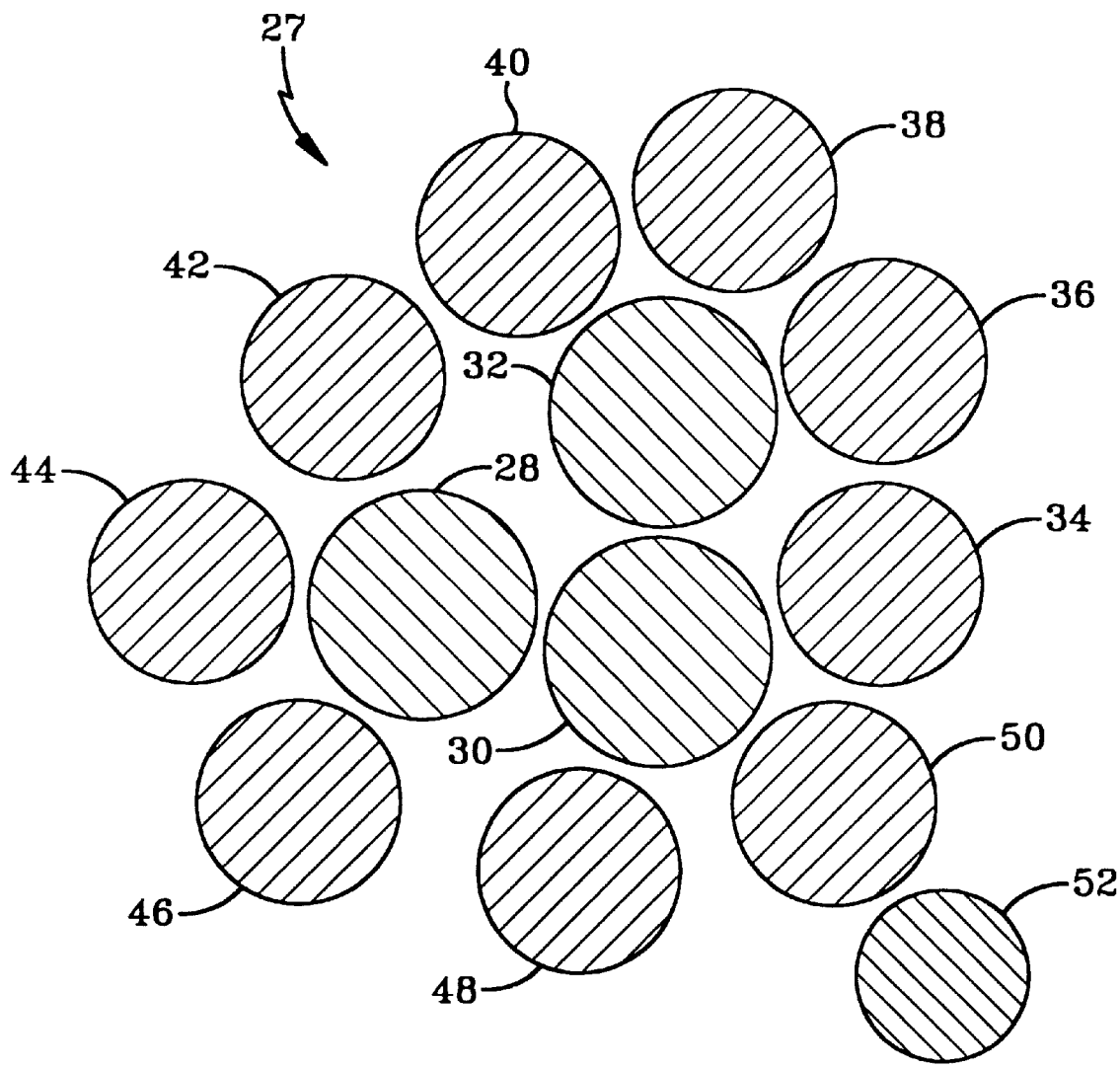
FIG. 3 is a cross-sectional view of a steel cord having a construction of the present invention.

In FIGS. 1, 2 and 3, there is illustrated a metallic cord 1 for reinforcing elastomers. Cords may be known by different nomenclatures. For example, the cord of the present invention may be called 2+1+9 or (2+1)/9. In the instance where a spiral wrap is wrapped around the sheath, the cord may be called 2+1+9+1 or (2+1)/9+1.

The cord of the present invention has a core composed of two filaments 2,4. These two filaments 2,4 may be untwisted and, therefore, parallel. The two filaments may also be intertwisted with each other. The lay length of each filament may vary. The term "lay length" as used in connection with the two filaments 2,4 in the core is the distance along the length of the core of two filaments in which the filament makes a complete revolution (360°) around the outside of the other filament. Therefore, the lay length of each filament in the core of two filaments 2,4 may range from 0.5 mm to infinity. The term infinity means twistless. Preferably, the lay length is from 2.5 to infinity.

The core of two filaments 2,4 is surrounded by a single filament 6. In the instances where the two filaments 2,4 in the core are twisted, the single filament 6 may be twisted in the same or different direction as the two filaments 2,4 in the core. Preferably, the single filament is twisted in the same direction as the two filaments 2,4 in the core, when used in combination with the embodiment where the two filaments 2,4 in the core are twisted. The term lay length as used in connection with the single filament 6 is the distance along the length of the core of two filaments 2,4 in which the filament 6 makes a complete revolution (360°) around the outside of the two filaments 2,4. The lay length of the single filament 6 ranges from 1 mm to 43 mm. Preferably, the lay length of the single filament 6 ranges from 2 mm to 27 mm.

The core of two filaments 2,4 and the single filament 6 are surrounded by a sheath of nine filaments 8,10,12,14,16,18, 20,22 and 24. The nine filaments 8,10,12,14,16,18,20,22 and 24 are twisted in the same or opposite direction to the underlying single filament 6. Preferably, the nine filaments are twisted in the same direction as the underlying single filament 6. The term lay lengths as used in connection with the individual nine filaments 8,10,12,14,16,18,20,22 and 24 is the distance along the length of the core of two filaments 2,4 and surrounding filament 6 in which the filament 8,10, 12,14,16,18,20,22 and 24 makes a complete 360° revolution around the outside of the core and surrounding filament. The lay length of each filament in the sheath may range from about 1 to 50 mm. Preferably, the lay length of each filament in the sheath ranges from about 3 to 40 mm.

The diameter of each filament in the core, single filament surrounding the core, and in the sheath of nine filaments may range from about 0.05 to 0.45 mm. Preferably, the diameter of the filament ranges from about 0.015 to 0.40 mm.

In accordance with one embodiment of the present invention, the filaments 2,4 in the core and the single filament 6 surrounding the core are of the same diameter than those nine filaments 8,10,12,14,16,18,20,22,24 and 26 in the surrounding sheath.

In accordance with another embodiment of the present invention, the filaments 28,30 in the core and the single filament 32 surrounding the core are of a different diameter than those nine filaments 34,36,38,40,42,44,46,48 and 50 in the surround sheath. In accordance with this embodiment, the filaments 28,30 in the core and the single filament 32 surrounding the core are a larger diameter than the nine filaments 34,36,38,40,42,44,46,48 and 50 in the surrounding sheath.

The tensile strength of each filament in the core as the surrounding single filament and sheath of nine filaments should be at least 3040 MPa−(1200×D) where D is the diameter of the filament. Preferably, the tensile strength of each filament ranges from about 3040 MPa–(1200×D) to 4400 MPa–(2000×D).

The cord 1 of the present invention may or may not have a spiral wrap 26. The spiral wrap 26 may have a diameter from about 0.1 to 0.3 mm. Preferably, the diameter is 0.15 mm. The lay direction of the spiral wrap is generally in the opposite direction and the cord lay direction with the lay length ranging from 3 to 7 mm. Preferably, the lay length of the spiral wrap is 5 mm.

The intended use of the cord of the present invention is in a rubber-reinforced article. Such articles will incorporate the cord of the present invention and impregnated with rubber as known to those skilled in the art. Representative of articles may use the cord of the present invention include belts, tires and hoses. In the most preferred application, the cord of the present invention is used in a belt ply of a pneumatic tire or the carcass ply of a pneumatic tire.

EXAMPLE

Two cords of the present invention were compared with a conventional prior art cord.

The first cord of the present invention consisted of a core of two filaments, surrounded by a single filament, with a sheath of nine filaments and a spiral wrap filament (2+1+9+1). The core filaments and the single filament surrounding the core of two filaments had a diameter of 0.265 mm. The diameter of each of the nine filaments in the sheath was a 0.245 mm. The diameter of the spiral wrap filament was 0.15 mm. The two filaments in the core were not twisted (0 mm lay length). The lay length of the surrounding single filament was 14 mm. The lay length of the nine filaments in sheath was 14.5 mm. The lay length of the spiral filament was 5 mm. The lay direction of the single filament surrounding the core was "S" or left-hand lay (when held vertically, the spirals conform in direction to the slope of the letter "S"). The lay direction of the nine filaments in the sheath was "S." The lay direction of the spiral filament was "Z" or right-hand lay (the spirals conform in direction to the slope of the letter "Z").

The second cord of the present invention was also a 2+1+9+1 construction; however, the core filaments and the single filament surrounding the core of two filaments had a diameter of 0.245 mm and the diameter of each of the nine filaments in the sheath was 0.245 mm. Everything else was the same as the first cord described above.

The control cord was known in the industry as 3/9+1. Known as a "bunched" construction, this cord has a core of three filaments surrounded by a sheath of nine filaments and a spiral wrap filament. The diameter of the three filaments used in the core was 0.265 mm. The diameter of the nine filaments in the sheath was 0.245 mm. The diameter of the spiral wrap filament was 0.15 mm. The three filaments in the core had a lay length of 14.5 mm. The lay length of each of the nine filaments was 14.5 mm. The lay length of the spiral filament was 5 mm. The lay direction of the three core filaments was S, the lay direction of the nine filaments was S and the lay direction of the spiral wrap filament was Z.

The three cords were tested for a variety of properties. Table I below lists the various properties for each cord.

Standard wire adhesion tests (SWAT) were conducted by embedding a single cord in the respective rubber compositions. The rubber articles were then cured at 150° C. for 28 minutes. The cord in these rubber compositions were then subjected to a pull-out test, according to ASTM Standard D2229-73. The results of these pull-out tests (SWAT) and rubber coverage are given below and identified as Original in Table II and expressed in Newtons. Adhesion tests were also conducted on the rubber articles after during and then subjecting the cured samples to (1) four days in 5 percent by weight aqueous sodium chloride solution at 90° C. and (2) four days in a steam autoclave at 100° C. The data is expressed in terms of Newtons and rubber coverage (N/RC).

The cords were also measured in accordance with the Air Diffusion Test. The Air Diffusion Test measures the rate of air permeability through the tire cord after being cured in a rubber compound. A 200 psi air or nitrogen gas source is used and flow is recorded by using a manometer. The rubber test sample is approximately 0.5×1.5 inches containing four of the cords for testing.

| TEST | 2 + 1 × 0.265 + 9 × 0.245 + 1 | 2 + 1 × 0.245 + 9 × 0.245 + 1 | 3 × 0.265/ 9 × 0.245 +1 |
|---|---|---|---|
| SWAT (N/RC) | | | |
| Original | 705/90 | 696/90 | 635/83 |
| 2 day salt | 631/40 | 649/43 | 561/33 |
| 2 day steam | 767/85 | 760/90 | 702/82 |
| Air diffusion (cc/min) | 0 | 1 | 6.8 |
| 3-roll fatigue (cycles) | 4738 | 4297 | 7020 |
| Tensile (N) | 1803 | 1691 | 1813 |
| Stiffness (mN-mm) | 9944 | 9063 | 7740 |
| Cord Diameter (mm) | 1.31 | 1.35 | 1.31 |

As can be seen from the above data, the values for the original, salt water and steam-aged tests conducted on the 2+1+9+1 cords were higher than the control. Such higher values indicate better rubber coverage and penetration within and between the filaments. The air diffusion test also indicates superior rubber coverage and penetration with the cord of the present invention. The superior rubber penetration prevents channels in the rubber along the cord's length thus preventing moisture and other corrosive chemicals from travelling along the cord's length.

What is claimed is:

1. An elastomeric article comprising a metallic cord having a 2+1+9 or 2+1+9+1 structure comprising
   (a) a core composed of two filaments;
   (b) a single filament surrounding said core; and
   (c) a sheath of nine filaments surrounding said core and single filament.

2. The elastomeric article of claim 1 wherein a spiral filament is wrapped around said sheath.

3. The elastomeric article of claim 2 wherein the spiral filament is twisted in an opposite direction to the twist direction of the sheath of nine filaments.

4. The elastomeric article of claim 1 wherein the lay length of the nine filaments in the sheath ranges from 1 to 50 mm.

5. The elastomeric article of claim 1 wherein the lay length of the spiral filament wrapped around said sheath ranges from 3 to 7 mm.

6. The elastomeric article of claim 1 wherein the lay length of the two filaments in the core is infinity.

7. The elastomeric article of claim 1 wherein the single filament surrounding said core is twisted in the same direction as the surrounding sheath of nine filaments in the cord.

8. The elastomeric article of claim 1 wherein the diameter of each filament ranges from 0.05 to 0.45 mm.

9. The elastomeric article of claim 1 wherein the two filaments in the core and the single filament surrounding said core have the same diameter.

10. The elastomeric article of claim 1 wherein the two filaments in the core and the nine filaments in the sheath surrounding said core and single filament have the same diameter.

11. The elastomeric article of claim 1 wherein the two filaments in the core and the nine filaments in the sheath surrounding said core and single filament have different diameters.

12. The elastomeric article of claim 1 wherein the tensile strength of each filament is at least 3040 MPa–(1200×D) where D is the diameter of the filament in millimeters.

13. The elastomeric article of claim 12 wherein the tensile strength of each filament ranges from about 3040 MPa–(1200×D) to 4400 MPa–(2000×D).

14. The elastomeric article of claim 1 wherein said elastomeric article is selected from the group consisting of belts, tires and hoses.

15. The elastomeric article of claim 1 wherein said elastomeric article is a pneumatic tire.

16. The elastomeric article of claim 15 wherein said cord is used in a belt ply of said pneumatic tire.

17. The elastomeric article of claim 15 wherein said cord is used in the carcass ply of said pneumatic tire.

* * * * *